April 24, 1951 J. C. MOUZON ET AL 2,549,845
SHIP'S MAGNETIC SUBMARINE DETECTOR
Filed June 26, 1945 3 Sheets-Sheet 1
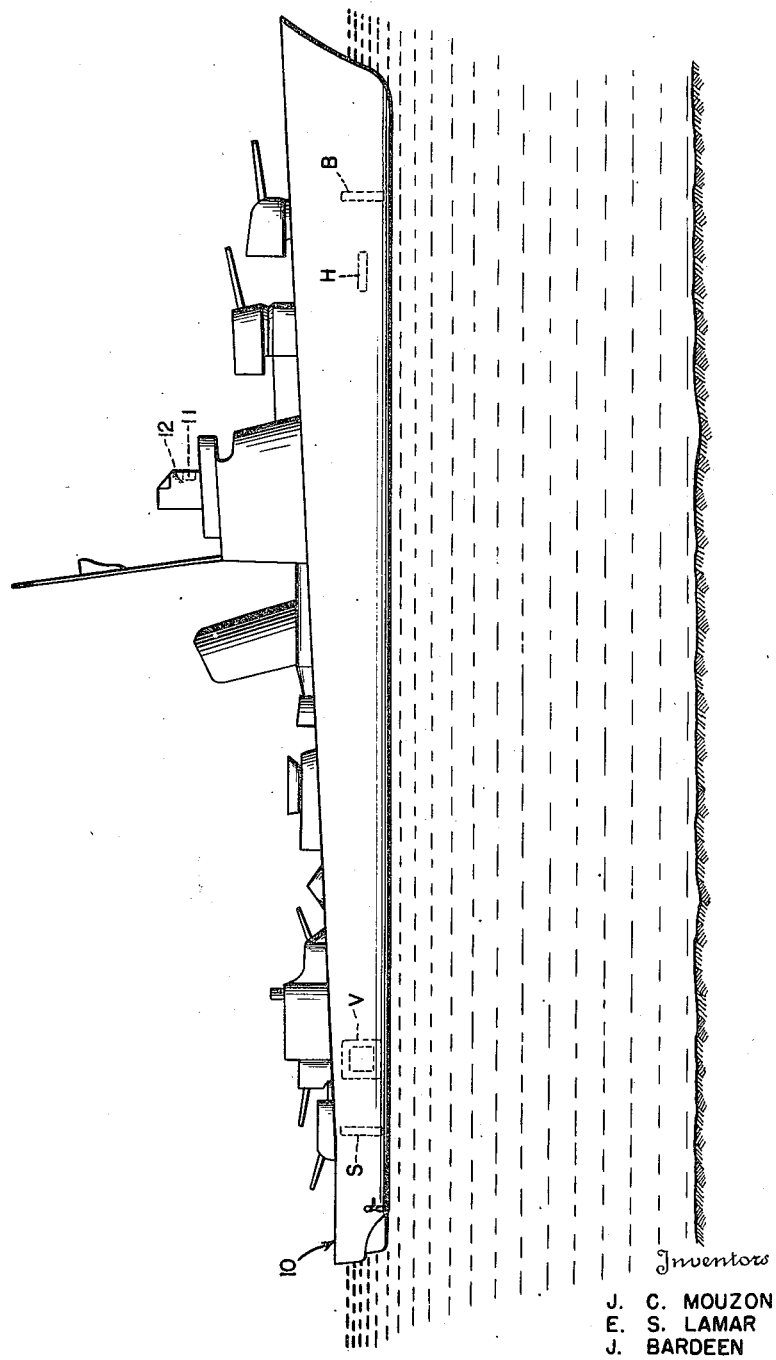
Inventors
J. C. MOUZON
E. S. LAMAR
J. BARDEEN
By Ralph L. Chappell
Attorney

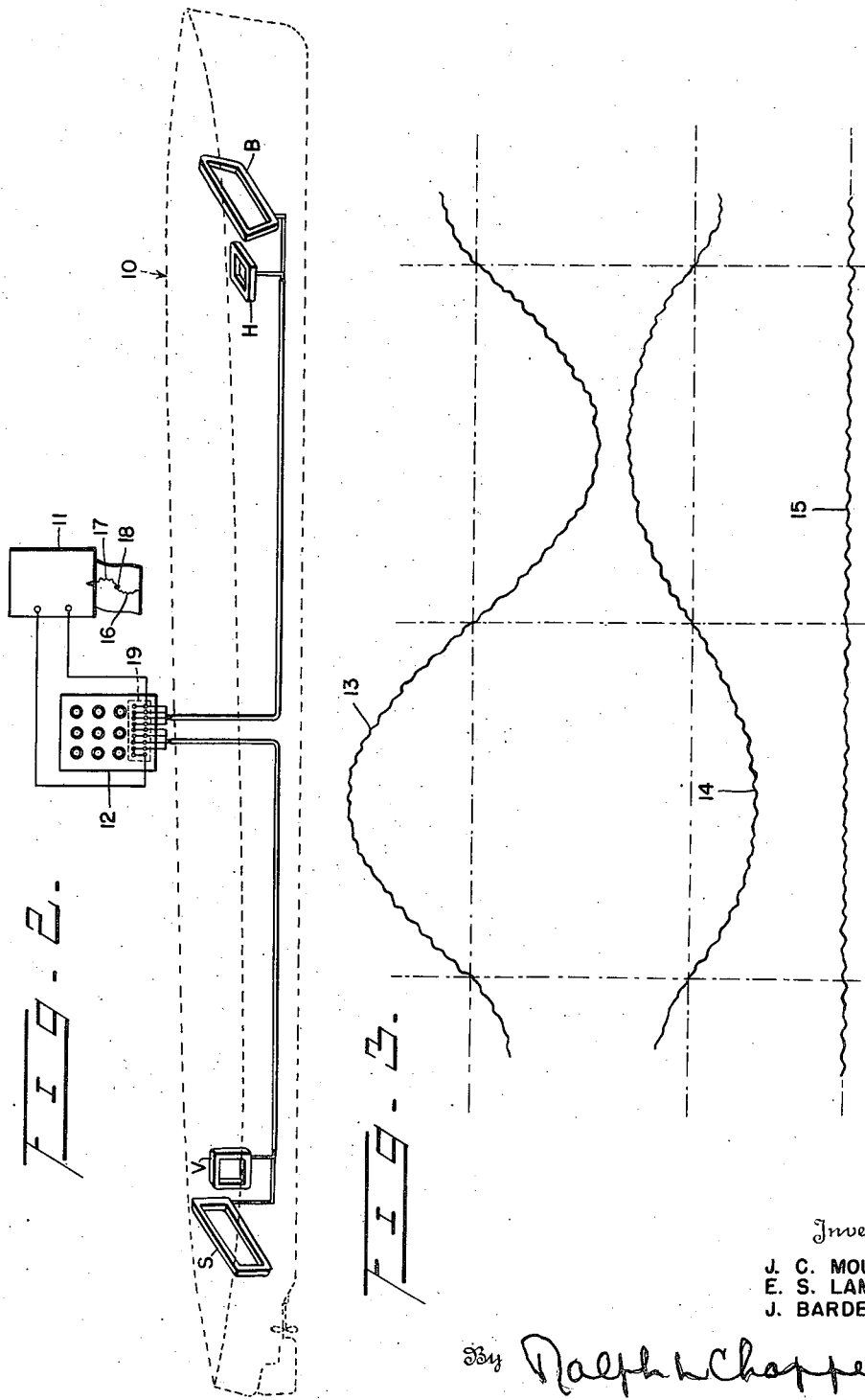

April 24, 1951 J. C. MOUZON ET AL 2,549,845
SHIP'S MAGNETIC SUBMARINE DETECTOR
Filed June 26, 1945 3 Sheets-Sheet 3

Inventors
J. C. MOUZON
E. S. LAMAR
J. BARDEEN
By Ralph L. Chappell
Attorney

Patented Apr. 24, 1951

2,549,845

UNITED STATES PATENT OFFICE 2,549,845

SHIP'S MAGNETIC SUBMARINE DETECTOR

James C. Mouzon, Philadelphia, Pa., Edward S. Lamar, Rockville, Md., and John Bardeen, Washington, D. C.

Application June 26, 1945, Serial No. 601,679

2 Claims. (Cl. 177—385)

(Granted under the act of March 3, 1883, as amended April 30, 1928; 370 O. G. 757)

This invention relates generally to devices employed on surface vessels for detecting the presence of a submarine moving within the vicinity thereof and more particularly to a magnetic submarine detector wherein a pair of detector coils are arranged on the surface vessel for generating an electro-motive force when the earth's magnetic field adjacent the vessel is distorted by the presence of a submarine moving within the vicinity thereof and wherein a pair of compensating coils are employed to balance out spurious electro-motive forces induced in the detector coils by the motion of the vessel in the earth's magnetic field.

In devices hitherto known or used for locating submarines from surface ships, it is the usual practice to employ two identical many-turn coils, one of which is located parallel to an athwartship bulkhead in the forward part of the ship and the other is located parallel to an athwartship bulkhead in the after part of the ship, such coils being electrically connected in series opposition across a suitable indicating device. When only the earth's magnetic field is present, the change in magnetic flux threading one coil is identical with the change in magnetic flux threading the other coil as the ship rolls, pitches or changes heading whereby the indicating device, which indicates the difference in the response of the coils, is unaffected by the motion. In the event that the surface ship approaches a submarine submerged within the vicinity thereof, the magnetic flux threading one coil will become greater than the flux threading the other coil whereby an electro-motive force is generated by the coil nearest the submarine and the indicating device is operated to indicate the presence of the submarine.

In actual practice, however, it has been found inconvenient to install on a surface vessel two coils which are exactly parallel. Moreover, providing the two coils are geometrically parallel, distortions in the earth's magnetic field surrounding the vessel introduced by the steel construction thereof prevents the magnetic flux from passing through each coil in the same direction. This lack of similarity in the direction of the flux lines with respect to each coil causes a difference between the response of the two coils as the vessel rolls, pitches or changes heading in the earth's magnetic field even if the sensitivity of the coils is the same.

In accordance with the preferred embodiment of the present invention, two detecting coils are employed, which coils are generally similar in construction and arranged in the same manner as the coils in the prior art devices heretofore described. Two smaller coils, hereinafter referred to as compensating coils, are also employed in the instant device for balancing out spurious differences in coil response produced by the lack of similarity in the direction of flux lines through the detecting coils as described in the foregoing. The detecting coils are connected electrically in series opposition, all four coils being connected in series across a suitable indicating device.

It is an object of the present invention to provide new and improved means for locating magnetic bodies from surface vessels.

Another object is the provision of a new and improved magnetic submarine detector in which the effects of pitch, roll and heading change of a surface vessel employing the detector are substantially eliminated.

Still another object is a new and improved submarine detector is to compensate for the distortion in the earth's magnetic field at the detecting coils caused by the magnetic character of the vessel carrying the coils.

Additional objects and advantages will become more clearly apparent as the description proceeds, reference being had to the accompanying drawings, in which:

Fig. 1 is a view showing the orientation of the component parts of the detecting device of the instant invention on a surface vessel;

Fig. 2 illustrates in diagrammatic form the orientation and wiring of the detecting device according to a preferred embodiment thereof;

Fig. 3 illustrates in graphic form the response of the detecting device during a balancing operation; and, Fig. 4 shows the complete electrical system of the instant device.

Figure 4:
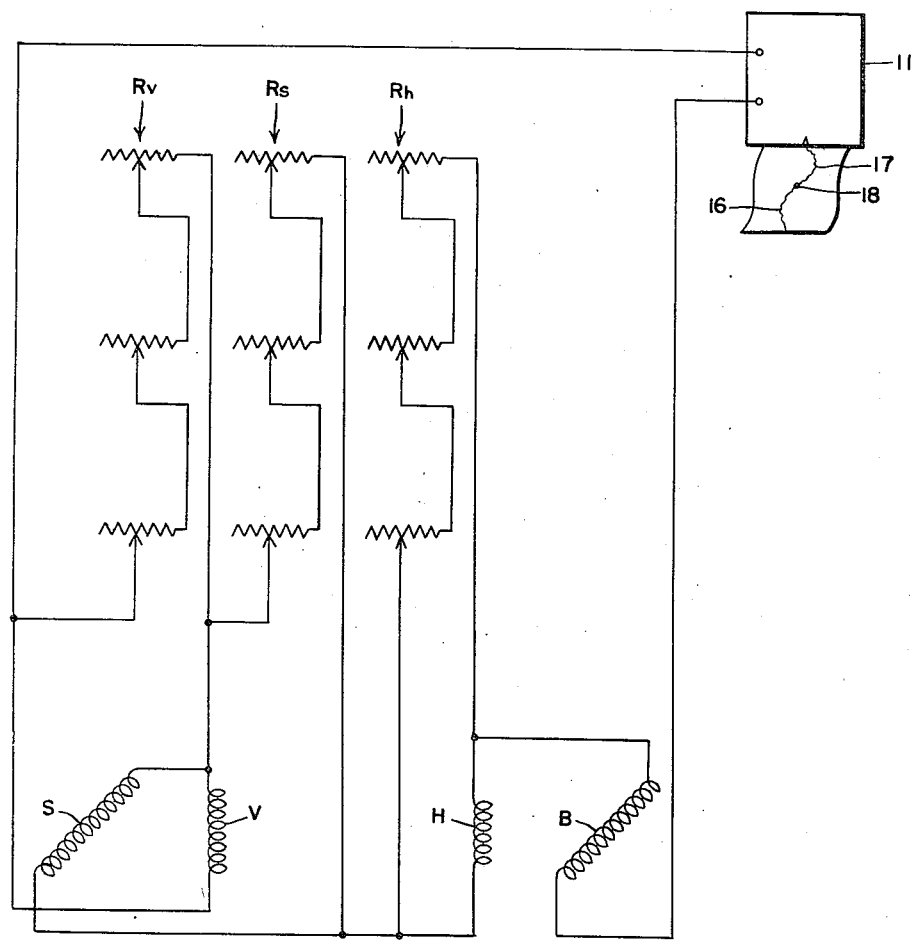

Referring now to the drawings, Fig. 1 and 2 show two coils, B and S, hereinafter referred to as the detecting coils. The coils B and S are substantially identical, many-turn coils, the B coil being located parallel to a bulkhead in the forward portion of a vessel 10 and the S coil being arranged in the after portion of the vessel effectively paralleled with the B coil. In order to obtain a higher degree of sensitivity of the coils, they are arranged in the greatest spaced relation feasible aboard the vessel. For the reason that the S coil, when installed within the vessel, is not only invariably slightly out of true parallelism with the B coil, but is also of slightly different size than the B coil, the S coil will have a principal component parallel but not equal to the B coil, such component being referred to hereinafter as the S' component and, in addition, two small components of which one will be in a vertical longitudinal plane and the other in a horizontal transverse plane. The effect produced by the S coil is the same as the sum of the effects produced by the three components thereof. The S coil component S', although parallel to the B coil is larger than B and if only the B and S coils were employed on the vessel 10 and were connected in opposition there would be considerable unbalance between them due to their different responses or sensitivities to the vessel's motion in the earth's magnetic field. Therefore, a variable resistor Rs is shunted across the S coil in order to reduce to a minimum the unbalance due to different sensitivities of the coils. Such an adjustment of the resistor Rs would make the S coil effectively equal in sensitivity to the B coil. In such an adjustment, the undesirable effects of the horizontal and vertical components of the S coil are reduced somewhat but not eliminated. The unbalance in the S' component will be referred to hereinafter as the bs unbalance because it is the unbalanced portion of the S coil which is parallel to the B coil. The horizontal and vertical components of the S coil cannot be eliminated without the installation of two extra coils on the vessel. Summarily, with two actual coils on a vessel, the B and S coils, there are effectively three unbalanced components which will respond to angular motions of the vessel.

Whereas it was assumed in the foregoing description that the S coil is larger than the B coil, in certain cases, the B coil may be larger than the S coil. Under such a condition, a variable resistor is shunted across the B coil in order to reduce to a minimum the unbalance due to the different sensitivities of the coils.

As heretofore described, it is possible to eliminate the bs unbalance by shunting the S coil with a proper value of the variable resistor Rs. To nullify the horizontal and vertical components of the S coil, two additional coils are employed, the H coil adapted to nullify the horizontal component and the V coil adapted to nullify the vertical component. Coil H is shunted with a variable resistor Rh while coil V is shunted with a variable resistor Rv and by choosing the proper values of resistors Rh and Rv the horizontal and vertical components respectively may be balanced.

In a given ship such, for example, as the flush deck destroyer illustrated, the general characteristics of the detecting device are as follows: the detecting coils, each about 200 square feet in area, are separated by about 200 feet and consist of about 300 turns of number 19 gauge wire; the two compensating coils H and V are each about 40 square feet in area and consist of about 300 turns of wire. The four coils are connected in series across a suitable indicating meter 11 with a suitable panel 12 being arranged between the coils and meter to facilitate the adjustment of the variable resistors Rs, Rh and Rv.

The indicating meter or recorder 11 may be of any well known type suitable for the purpose but preferably is of the recording type in which a galvanometer element is employed to activate photo-electric means. The photo-electric means, in turn, controls the operation of the recording element of the meter, which element reproduces in graphic form the character of the signal received by the detecting coils. Fig. 2 of the drawings shows diagrammatically the panel 12 which is a watertight box housing the resistors Rs, Rh and Rv in a position near the recorder 11.

The various steps necessary in the balancing of the detecting device will now be outlined with the ship 10 underway. The bs unbalance may be eliminated by initially setting the resistors Rs, Rh and Rv to zero thereby short-circuiting coils S, H and V respectively. It will be found that any angular motion of the ship will cause a considerable deflection of the meter 11 in response to the voltage generated by coil B. The resistance Rs across the S coil is increased from zero to 1000 ohms. If the meter deflection is now greater than before, the connections of the B and S coils are reversed at the terminal block 19, the B and S coils are now bucking each other and the meter deflection should be much smaller than before.

The next step in the elimination of the bs unbalance is to leave the 1000 ohms resistance across the S coil and swing the ship so that the rate of change of heading is constant and take a complete record with the recorder 11 during the 360 degrees of the swing. During the swing, the meter 11 will be observed to deflect from an initial or zero position to one side during 180 degrees of the swing and to the other side of the zero position during the remaining 180 degrees. The direction of movement of the meter element from an initial or zero position is hereinafter referred to as phase and thus during the foregoing swing of the vessel the meter performs a phase reversing operation. The magnetic heading at which the phase of the meter deflection reverses depends upon the time taken for the swing and the orientation of the B and S coils.

The resistance across the S coil is now adjusted to 10,000 ohms and the swing described in the foregoing paragraph repeated. If the sign of the meter deflection is opposite everywhere to that observed with 1,000 ohms across the S coil, then the proper value for Rs lies between 1,000 and 10,000 ohms. If the deflections are of the same sign but smaller magnitude, Rs is removed from the S coil and shunted across the B coil, using 10,000 instead of 1,000 ohms resistance. This may be accomplished conveniently by transposing the B and S coil connections at the terminal block 19. If the deflections are of the same sign as those in the last swing, the proper value for the shunt resistance is between zero and 10,000 ohms. In the event that the sensitivities of the B and S coils are so very nearly alike that it is difficult to obtain the proper shunt resistance for eliminating bs unbalance, the response of one of the detecting coils is reduced, using a fixed resistance shunted there-across, so that it lies in the range covered by the other coil with the variable shunt resistance. If the coil having the smaller response is shunted with a 10,000 ohms fixed resistor, then a balance can be obtained with a shunt of less than 10,000 ohms across the coil having the greater response.

Having determined two values of shunt resistance between which the setting for minimum deflection lies, some new value between these two is set and another swing executed. If the sign of the deflection is observed to be everywhere the same as recorded using the lower of the two above named resistors, then the third setting is too low also. Swinging the ship is continued, once for each trial resistance setting until the difference between the maximum deflections observed on successive swings can no longer be distinguished above the random deflection background due to local magnetic disturbances on board the vessel. With each swing, the sign of the meter deflection is employed to determine whether a given setting is too low or too high.

Elimination of the horizontal unbalance of the S coil is accomplished by rolling the vessel 10 approximately 5 degrees to either port or starboard. The necessary adjustments to compensate for roll of the vessel are most easily accomplished if the magnetic heading of the ship is either east or west, it being more difficult to make these adjustments if the magnetic heading of the ship is either north or south. With R$h$ set to zero, the phase of the meter deflection relative to the roll of the ship is observed, and as the ship rolls, for example, to starboard the direction or phase of the meter deflection is noted. The resistance R$h$ is now increased to its maximum value and the phase of the meter deflection during a subsequent roll to starboard is again observed. If the phase has reversed, the best setting for R$h$ lies between zero and the maximum value thereof. If, however, the meter deflection increases in magnitude and does not change phase during the starboard roll, the connections to the H coil are required to be reversed to give the proper polarity. Having thus determined the polarity for the H coil and the phase of meter deflection for zero and maximum values of R$h$, another trial setting of resistance R$h$ is made and the phase of meter deflection again observed. If the phase is the same as that for a zero value of R$h$, the setting is too low, and if the phase is opposite, the setting is too high. The unbalance due to the vertical component of the S coil is also eliminated by rolling the vessel at least 5 degrees. During such adjustment, the magnetic heading of the vessel may be in any direction but preferably on a north or south heading. The adjustment of the V coil is made in exactly the same manner as that of the H coil, using, of course, resistor R$v$ instead of resistor R$h$.

Fig. 3 of the drawings indicates in graphic form the response of the meter or recorder 11 during the balancing operations described in the foregoing, curve 13 showing the initial unbalanced condition of the coils, curve 14 showing the condition after the first adjustment has been made and curve 15 showing the final balanced condition. The curves 13, 14 and 15 illustrate the response of the recorder during the balancing operations for the components of the S coil. In the case of the $bs$ unbalance, curve 13 illustrates the response of the detecting coils with 1,000 ohms shunted across the S coil, curve 14 illustrates the response of the detecting coils with 10,000 ohms shunted across the S coil and curve 15 illustrates the final balanced condition of the detecting coils with a proper value of resistance, between 1,000 and 10,000 ohms, shunted across the S coil.

In the case of the horizontal and vertical unbalances of the S coil, curve 13 indicates the phase of meter deflection with zero resistance shunted across resistors R$h$ and R$v$, respectively. Curve 14 indicates the phase of meter deflection with maximum values of R$h$ and R$v$ employed and curve 15 indicates a balanced condition of the H and V coils shown by a substantially zero meter deflection with a proper value of the resistors R$h$ and R$v$, as heretofore described.

Since the detecting device of the present invention is magnetically controlled, any disturbance which may cause magnetic disturbances at either of the coils B and S may cause the meter 11 to indicate or record. In such case, these disturbances should be studied, recognized and discounted. Generally, movable masses such, for example, as bulkhead doors should be secured during attack in order that spurious operation of the meter will not be produced thereby.

It is well known that a steel vessel such, for example, as a submarine acquires a certain degree of magnetism in the process of fabrication thereof and also during the travel of the vessel through the earth's magnetic field, the intensity of the submarine's magnetic field being greater within close proximity to the submarine than at relatively greater distances therefrom. Let it be assumed, by way of example, that the vessel 10 is approaching a submarine submerged in the path of travel of the vessel and whose vertical plane is at right angles to the vertical plane of the vessel. Let it further be assumed that the three components of the S coil have been balanced such that any angular motion of the vessel does not produce spurious magnetic signals capable of causing the recorder 11 to be deflected.

As the detecting coil B, mounted in the bow of the vessel, enters the threshold of sensitivity of the magnetic field set up by the submarine, the number of flux lines threading the B coil is greater than that threading the S coil mounted in the stern of the vessel. When this occurs, an electromotive force of sufficient magnitude is induced in the B coil to actuate the recorder 11. As the B coil passes through the vertical plane of the submarine, the number of flux lines threading therethrough decreases, thereby decreasing the electromotive force generated therein and reversing the direction of movement of the recording element. When the detecting coils B and S are equidistant from the vertical plane of the submarine, the number of flux lines threading each of the detecting coils is the same and the recording element of the recorder is restored to its zero position. As the vessel moves beyond the vertical plane of the submarine, the number of flux lines threading the S coil is greater than that threading the B coil and an electro-motive force is induced therein which causes the recording element of the recorder to shift phase and continue to deflect in a direction opposite to the deflection initially produced by the electro-motive force generated in the B coil. When the vessel moves out of the magnetic field of the submarine, a zero response exists between the detecting coils due to the equal number of flux lines threading therethrough and the recording element is restored to its initial or zero position illustrated by the curve 15.

The trace of the magnetic signal received by the vessel 10 during its movement over the submarine and reproduced by the recorder 11 is shown, by way of example, in Fig. 4, the portion 16 thereof indicating that portion of the signal received by the B coil and the portion 17 thereof indicating the portion of the signal received by the S coil, the point 18 on the trace indicating the instant at which the vessel is directly over the submarine. It should be understood, of course, that the character of the magnetic signal received by the vessel from the submarine is proportional to the magnetic headings of the vessel and the submarine, to the relative positions of the vessel and submarine, to the speeds thereof and to the magnetic condition of the submarine.

It will be understood that the four coils, the two detecting and two compensating coils, may be arranged in any manner on board a surface vessel and a suitable balance between the coils achieved. However, in order to achieve a suitable balance in the quickest and most efficient manner, the coils are arranged in the manner shown in Fig. 2 of the drawings.

From the foregoing, it should now be apparent that a magnetic submarine detector has been provided which is well adapted to fulfill the aforesaid objects of the invention.

While the invention has been disclosed in particularity to an example thereof which gives satisfactory results, it readily will be apparent to those skilled in the art, after understanding the invention, that further embodiments and modifications may be made without departing from the spirit and scope of the invention as defined by the claims appended hereto.

The invention herein described and claimed may be manufactured and used by or for the Government of the United States of America without payment of any royalties thereon or therefor.

What is claimed as new and desired to be secured by Letters Patent of the United States is:

1. A magnetic submarine detector system mounted within a moving vessel and comprising, in combination, a pair of opposedly connected non-rotating detecting coils carried by the vessel and mounted in the vicinity of the bow and stern of the vessel respectively and in planes substantially parallel with respect to one another and substantially normal to the longitudinal axis of the vessel for generating resultant electrical signals respectively in accordance with the movement of the vessel through the earth's magnetic field, the resultant signal of one of said coils comprising one desired component and two undesired components, a pair of non-rotating compensating coils electrically connected in series with and opposedly to said one of the detecting coils and respectively mounted in the vicinity of the detecting coils, said compensating coils being disposed in substantially mutual perpendicular relationship with the detecting coils and with one another for generating auxiliary electrical signals for balancing out said undesired components of the resultant signal of said one of said detecting coils, said undesired components arising in said one of said detecting coils by reason of slight variations from true mutual perpendicularity between the detecting and compensating coils, a plurality of variable resistors two of which are respectively directly and individually shunt connected to the compensating coils for adjusting the auxiliary signals thereof to equality and nulling relationship with the undesired components of said one of the detecting coils and one of which resistors is directly and individually shunt connected to said one of said detecting coils for adjusting the desired component thereof to equality with the resultant signal of the other detecting coil thereby to null the output of the detector during movement of the vessel in the earth's undisturbed magnetic field, each said resistor being shunt connected directly only to the coil individual thereto whereby an adjustment of one of said resistors affects substantially only the voltage output of the coil individual thereto and thereby minimizes the effect of the adjustments upon the desired phase relationship between the desired component of said one detecting coil and the resultant signal of the other of said detecting coils, and an indicating device in series connection with all of said coils and adapted to be operated by a signal generated in response to the presence of the magnetic field of a submarine.

2. A method for compensating for the effects of the earth's magnetic field on a submarine detector mounted on a vessel under way comprising the steps of sequentially adjusting the voltage output of one of two opposedly connected substantially parallel detecting coils of said detector to equality of the voltage output of the other detecting coil while maintaining a constant magnetic heading and the voltage output of said other detecting coil constant in the uniform magnetic field of the earth, said one detecting coil having a pure resistance element shunt connected thereacross, changing the magnetic heading of said vessel at a uniform rate through a series of 360° swings, recording the voltage output of the detecting coils while executing each of said swings, adjusting the said shunt connected resistance of said one detecting coil after each of said swings thereby to progressively equalize the degree of sensitivity of said detecting coils during changes in the magnetic heading of the vessel, and sequentially adjusting the voltage outputs of two stationary compensating coils located in planes substantially perpendicular to each other and to the planes of the detecting coils and connected in series with said detecting coils and each shunted by a pure resistance element while maintaining the adjustment of said one detecting coil constant as the vessel is rolled sequentially on an east-west magnetic heading and on a north-south magnetic heading thereby to equalize the opposing voltages of said detecting coils regardless of the magnetic heading, pitch and roll of the vessel.

JAMES C. MOUZON.
EDWARD S. LAMAR.
JOHN BARDEEN.

REFERENCES CITED

The following references are of record in the file of this patent:

UNITED STATES PATENTS

| Number | Name | Date |
|---|---|---|
| 1,548,024 | Cuntz | Aug. 4, 1925 |
| 2,036,856 | Drake | Apr. 7, 1936 |
| 2,238,072 | Nelson | Apr. 15, 1941 |
| 2,379,447 | Lindsey | July 3, 1945 |
| 2,424,772 | Rieber | July 29, 1947 |

FOREIGN PATENTS

| Number | Country | Date |
|---|---|---|
| 130,050 | Great Britain | July 31, 1919 |
| 130,350 | Great Britain | Aug. 7, 1919 |